US00RE37247E

(19) United States
(12) Reissued Patent
Blickhan et al.

(10) Patent Number: US RE37,247 E
(45) Date of Reissued Patent: Jun. 26, 2001

(54) ROUTER

(75) Inventors: Stefan Blickhan, Wiesbaden; Achim Buchholz, Limburg; Karl-Heinz Ruckert, Idstein; Gustave Sieber, Frankfurt, all of (DE)

(73) Assignee: Black & Decker Inc., Newark, DE (US)

(21) Appl. No.: 09/217,518

(22) Filed: Dec. 16, 1998

Related U.S. Patent Documents

Reissue of:
(64) Patent No.: 5,584,620
Issued: Dec. 17, 1996
Appl. No.: 08/398,189
Filed: Mar. 2, 1995

(30) Foreign Application Priority Data

Mar. 3, 1994 (DE) ..... 44 07 420

(51) Int. Cl.[7] ..... B27G 19/00
(52) U.S. Cl. ..... 409/137; 144/252.1; 409/182
(58) Field of Search ..... 409/137, 175, 409/181, 182; 144/252.1, 252.2; 408/67

(56) References Cited

U.S. PATENT DOCUMENTS 1,581,719 * 4/1926 Carter ..... 409/137
4,051,880 * 10/1977 Hestily ..... 409/182
4,606,685 * 8/1986 Maier et al. ..... 409/137
4,938,264 * 7/1990 Ferenczffy ..... 409/182
5,584,620 * 12/1996 Blicklan et al. ..... 409/137

FOREIGN PATENT DOCUMENTS

191509 * 8/1986 (EP) .
426321 * 5/1991 (EP) .
2329392 * 5/1977 (FR) .

* cited by examiner

*Primary Examiner*—Daniel W. Howell
(74) *Attorney, Agent, or Firm*—Harness, Dickey & Pierce P.L.C.

(57) ABSTRACT

A router with a cutter head containing the drive motor so that the cutter head is held in a displaceable manner at guide columns which are secured at a base plate which is provided with a central opening for the passage of a cutter inserted in the tool holder of the cutter head, is provided in the base plate with a suction intake channel which surrounds the central opening over at least the larger part of its periphery and to which a suction extraction channel is connected. The suction extraction channel runs inside one of the guide columns which for this purpose has been constructed so that it is hollow.

15 Claims, 2 Drawing Sheets

ROUTER

Matter enclosed in heavy brackets [ ] appears in the original patent but forms no part of this reissue specification; matter printed in italics indicates the additions made by reissue.

The invention relates to a router with a cutter head containing the drive motor which is held in a displaceable manner generally at two guide columns which are secured at a base plate frequently composed of several parts and which extend away from it vertically to its workpiece engagement surface, and with a tool holder for a cutter or the like provided at the side of the cutter head facing towards the base plate and coupled to the drive motor, in the axial extension of which the base plate is provided with an opening or recess for the passage of the cutter or the like wherein the base plate contains a suction intake channel which surrounds the opening or recess over at least the larger part of its periphery which channel has at least a suction intake opening facing towards the opening or recess and to which channel a suction extraction channel is connected which extends upwards from the base plate in the area of a guide column and runs in this area coaxially with this guide column and the end of which which is remote from the base plate can be connected to a suction extraction device.

In a known router of this type (EP 0 191 509 B1) a ring-shaped suction extraction channel extends from the suction intake channel upwards so that the one guide column forms the inner boundary wall and a bellows, the lower end of which is connected to the base plate and the upper end of which is connected to the cutter head, forms the outer boundary wall of the annular space. At the upper end of the annular space the suction extraction channel continues in a chamber surrounding the armature shaft in the cutter head and then runs downwards about the armature shaft into a fan chamber to which an attached suction extraction tube is connected which can be connected to a suction extraction device as for example a vacuum cleaner.

On this known structure the suction extraction channel is thus defined in its lower area by a bellows. The use of a bellows of this type for the relatively rough application in connection with a router is always associated with the risk that the bellows will be damaged so that then chips and dust particles extracted from the area of the cutter can emerge outwards through the damaged bellows. In addition the further course of the suction extraction channel inside the cutter head requires a relatively complicated and costly structure of the cutter head housing.

The object of the invention is to provide for a router with which dust removal can be carried out in a simple and reliable manner in the area of the cutter or the like.

To achieve this objective a router of the type mentioned in the introduction is constructed according to the invention in such a way that the one guide column is hollow and that the suction extraction channel runs inside the hollow guide column. In a particularly preferred embodiment the connection for the suction extraction device is provided at the upper end of the hollow guide column.

In the router according to the invention one of the guide columns is used for forming the suction extraction channel and constructed hollow for the purpose that on the one hand no additional components are required which form a wall of the suction extraction channel and which could be damaged in operation and thus become permeable and on the other hand a simple and substantially straight movement of the dust is achieved so that no excessively high vacuum is required for the suction removal and no dust particles can be deposited in the guide areas of the suction extraction channel.

The structure is particularly simple if the connection for the suction extraction device is provided at the upper end of the hollow guide column as then the complete suction extraction channel runs from the base plate to the connection for the suction device inside the hollow guide column, i.e. no connections or transitions are present which would require additional sealing.

The outside diameter of the hollow guide column is preferably larger than the outside diameter of the other guide column so that a suction extraction channel with a cross section which is adequate for effective dust collection can be formed in the hollow guide column.

In known routers the cutter head is usually supported via at least one pressure spring in relation to the base plate, so that the pressure spring can be located inside a guide column and is supported with one end at the base plate and with the other end at a section of the cutter head (EP 0 191 509 B1) extending telescopically from above into the guide column. If, however, as in the case of the router according to the invention, a hollow guide column is used so as to form the suction extraction channel with its inner space, no pressure spring can be disposed in this position.

In a router according to the invention it is preferred to provide a tension spring which surrounds the upper end of the hollow guide column on the outside between the cutter head and the upper end of the hollow guide column and this spring can for example be surrounded by a bellows. A tension spring of this type produces the spring tension required for moving the cutter head into its raised position and is not located in the area between cutter head and base plate, i.e. not in the area which in operation is particularly exposed to the danger of damage.

The invention will be explained in greater detail below on the basis of the figures which give schematic views of an embodiment.

Figure 1:
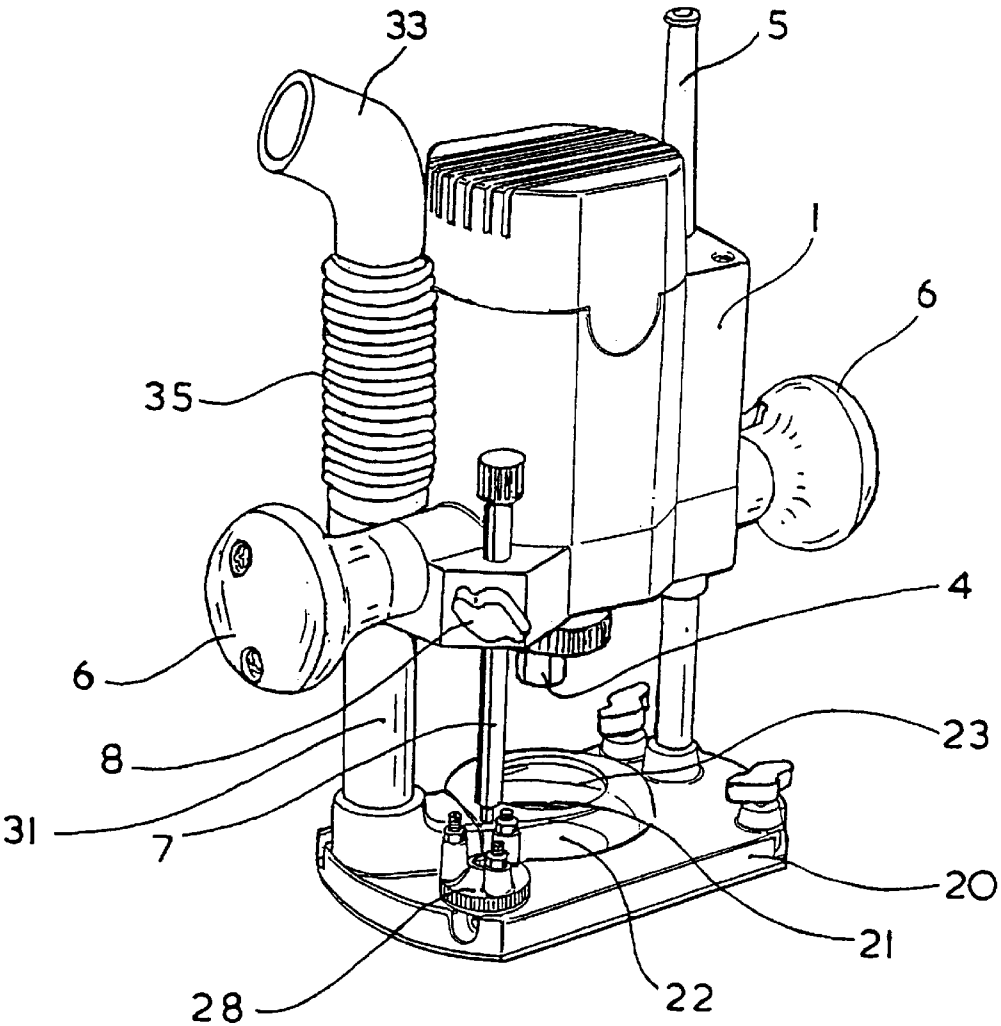
FIG. 1 shows a perspective view of a router.
Figure 2:
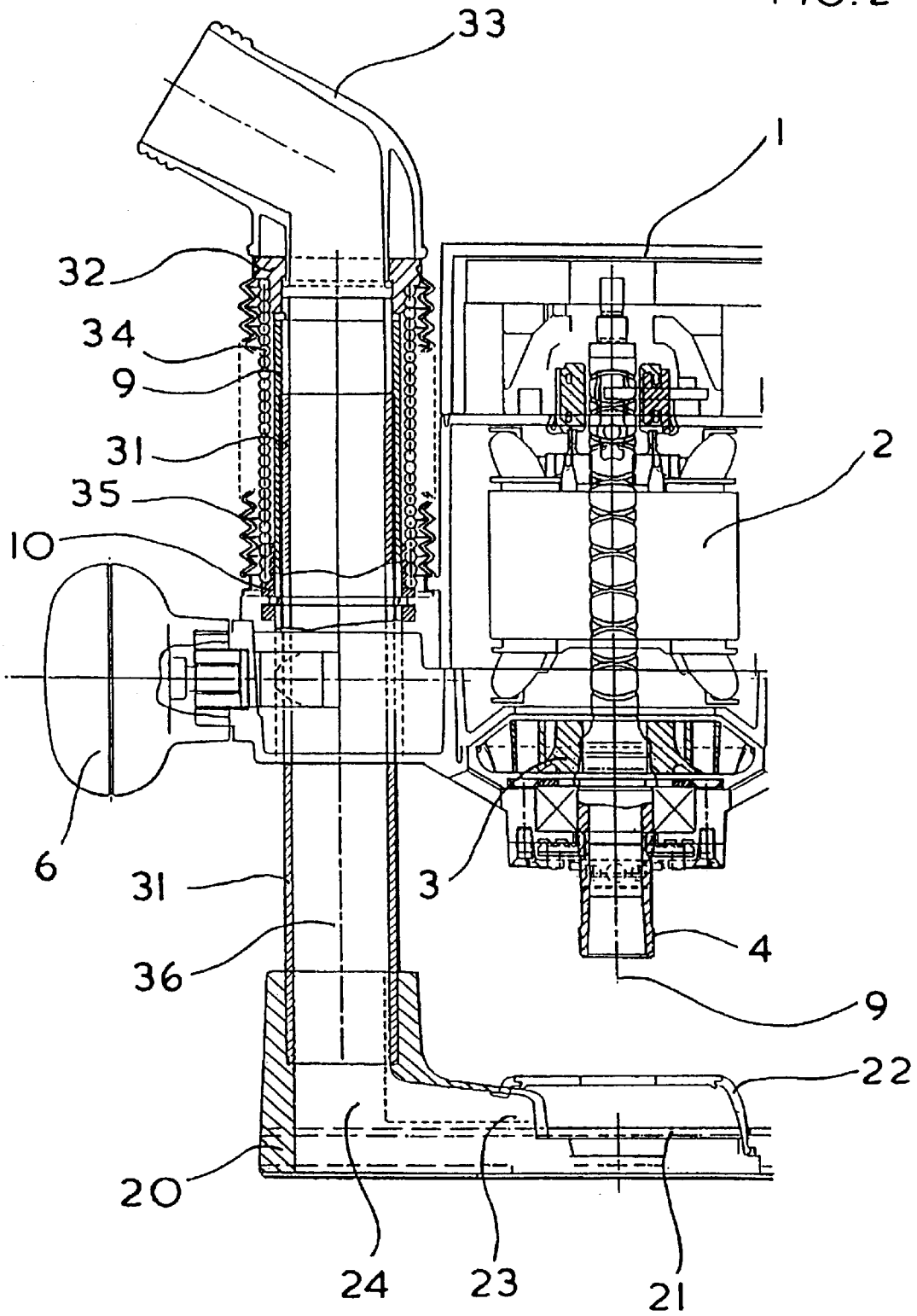
FIG. 2 shows a partially sectional view and a partially broken partial view of the router of FIG. 1.

The illustrated router has a cutter head 1, in which is located the electric motor 2 shown in FIG. 2 which is mounted in the cutter head 1 in a convential way and which carries on its armature shaft a fan wheel 3 which is also of the usual type. The lower end of the armature shaft of the electric motor 2 is constructed in the usual manner as a tool holder 4. A power supply cable which is not shown and which is run through a reinforcement bush 5 into the cutter head 1 is used for supplying the electric motor 2.

A depth adjustment rod 7 is mounted on the cutter head which is fixed at a desired height by means of a clamping screw 8. Conventional handles 6 are also located at the side of the cutter head 1 and one of these handles generally cooperates with a clamping device so as to fix the cutter head 1 at the desired height at the corresponding guide column by clamping.

The cutter head 1 is held so that it can be displaced at guide columns 30, 31 in a manner which is still to be described and these guide columns are secured with their lower ends at a base plate 20. The base plate 20 has a continuous central opening 21 which is arranged substantially centrally in relation to the axis of rotation 12 of the armature shaft of the electric motor 2 and thus of the axis of rotation of the tool holder 4 so that a cutter or the like inserted in the tool holder 4 can be brought into engagement with the workpiece to be processed by lowering the cutter head 1 through the central opening 21 with the lower surface of the base plate 20 being normally fully or partially supported on the workpiece.

A conventional rotary plate 28 is mounted on the upper side of the base plate 20 adjacent to the guide column 31 and this rotary plate has several depth stops which are set to different heights and which cooperate with the depth adjustment rod 7 so that the operator can allow the cutter head 1 to be lowered to a selected predetermined depth.

The base plate 20 has an upper and a lower wall, between which is formed a suction intake channel 23 which surrounds the central opening 21, which is open to it and which in the upward direction is defined by or formed together with a cover 22 which for example is made of a transparent plastics material.

As can be seen particularly in FIG. 2 the guide column 31 which has a larger diameter than the guide column 30 is constructed as a hollow tube which is circular in cross section and which is open at both ends. The lower end of the guide column 31 is connected rigidly to the base plate 20 via a protrusion of the base plate 20 so that its internal part 36 is connected to the suction intake channel 23 via a connection channel 24. A holding ring 32 is secured at the upper end of the guide column 31 and a suction extraction connection 33 is inserted into the holding ring in a detachable manner. The suction extraction connection 32 can for example be connected to a vacuum cleaner or the like.

The cutter head 1 is provided with two tubular guide areas into which the guide columns 30 and 31 extend. The guide area for the guide column 31 has, as can be seen in FIG. 2, a guide tube 9 which encompasses the guide column 31 and to the lower end of which a retaining bush 10 is secured. The guide tube 9 has been dimensioned in such a way that a guiding which as far as possible is free from play but which is sliding is achieved on the guide column 31.

The lower turns of a helical tension spring 34 are secured to the outer side of the retaining bush 10 and its upper turns are fitted at the holding ring 32 so that there is a flexible connection between the holding ring 32 and thereby with the upper end of the guide column 31 and the retaining bush 10 and thereby with the lower end of the guide tube 9. The tension spring 34 surrounding the guide tube 9 is surrounded by a bellows 35, the upper end of which is secured at the holding ring 32 and the lower end of which is secured at the retaining bush 10.

As can be recognised a force drawing the cutter head 1 into the illustrated elevated position is applied by the tension spring 34 so that it is not necessary to provide for an additional spring at the opposite side, i.e. in the area of the guide column 30.

It should be noted that the retaining bush 10 is located in the area of the clamping mounting of the adjacent handle 6, through which it is possible in the conventional manner to clamp the cutter head 1 in a position at the guide column 31 lowered against the force of the tension spring 34 so as to achieve a predetermined lowered position of a cutter or the like inserted in the tool holder 4.

If a vacuum source e.g. in the form of a vacuum cleaner is connected at the free end of the suction extraction connection 33 of the illustrated router via a hose or the like and a workpiece is then processed the chips and dust generated in the cutting area which, as a result of the turning of the cutter or the like already have an outward movement component, will be sucked out of the area of the central opening 21 into the suction intake channel 23 and from there pass via the connection channel 24 into the suction extraction channel 36 which runs on the inside of the guide column 31 and through the suction extraction connection 33 to the vacuum source. In this arrangement a flow pattern without harmful deposits and without sharp deflections is achieved. Moreover there are no sealing problems as the guide column 31, the holding ring 32 and the suction extraction connection 33 do not change their position in relation to the base plate 20 during the operation.

We claim:

1. A router with a cutter head [(1)] containing the drive motor [(2)] and held in a displaceable manner at first and second guide columns [(30,31)] which are secured at a base plate [(20)] and which extend away from it vertically to its workpiece engagement surface and with a tool holder [(4)] for a cutter provided at the side of the cutter head [(1)] facing towards the base plate [(20)] and coupled to the drive motor [(2)], in the axial extension of which the base plate [(20)] is provided with an opening [(21)] or recess for the passage of the cutter, wherein the base plate [(20)] contains a suction intake channel [(23)] which surrounds the opening [(21)] or recess over at least the larger part of its periphery which channel has at least a suction intake opening facing towards the opening [(21)] or recess and to which channel at least a suction extraction channel [(36)] is connected which extends upwards from the base plate [(20)] in the area of said first guide column [(31)] and runs in this area coaxially with said first guide column [(31)] and the end of which is remote from the base plate [(20)] can be connected to a suction extraction device, characterised in that said first guide column [(31)] is hollow and that said suction extraction channel [(36)] runs inside said first guide column [(36)].

2. A router according to claim 1, characterised in that the connection [(33)] for the suction extraction device is provided at the upper end of said first guide column [(31)].

3. A router according to claim 1, characterised in that the outside diameter of said first guide column [(31)] is larger than the outside diameter of said second guide column [(30)].

4. A router according to claim 1, characterised in that a tension spring [(34)] which surrounds the upper end of said first guide column [(31)] on the outside is provided between the cutter head [(1)] and the upper end of the hollow guide column [(31)].

5. A router according to claim 4, characterised in that said tension spring [(34)] is surrounded by a bellows [(35)].

*6. A router comprising:*

*a cutter head;*

*a first and second guide column, said cutter head being displaceable on said first and second guide columns;*

*a base plate supporting said first and second guide columns, said base plate including an opening for receiving a cutter coupled with said cutter head, and a channel in said base plate adjacent said opening; and*

*one of said guide columns defining an extraction channel, said extraction channel coupled with said base plate channel for exhausting debris at said base plate opening.*

*7. The router according to claim 6, wherein said extraction channel being coupled with a suction device.*

*8. The router according to claim 6, wherein said channel defined by a surface, said surface directing debris to said extraction channel.*

*9. The router according to claim 6, wherein said guide column defining said extraction channel has a larger cross-sectional area than said other guide column.*

*10. The router according to claim 6, wherein a suction extraction connection being coupled with said extraction channel for enabling connection of a suction source.*

*11. The router according to claim 6, wherein a connection channel is positioned between said base plate channel and said extraction channel.*

*12. The router according to claim 6, wherein a cover is coupled with said base plate adjacent said opening.*

*13. The router according to claim 12, wherein said cover being transparent.*

*14. The router according to claim 10, wherein a holding ring being coupled with said guide column for enabling removable insertion of said suction extraction connection.*

*15. The router according to claim 14, wherein a biasing member being positioned on said guide column between said holding ring and said cutter head for providing a force for movement of said cutter bead along said guide columns.*

* * * * *